United States Patent [19]

Hamann

[11] 4,378,757

[45] Apr. 5, 1983

[54] MILKING METHOD AND MACHINE

[76] Inventor: Jörn Hamann, Aschauweg 18, D-2300 Kiel-Kronshagen, Fed. Rep. of Germany

[21] Appl. No.: 267,728

[22] Filed: May 28, 1981

[30] Foreign Application Priority Data

May 31, 1980 [DE] Fed. Rep. of Germany ....... 3020758

[51] Int. Cl.³ .............................................. A01J 5/10
[52] U.S. Cl. ............................... 119/14.02; 119/14.36
[58] Field of Search ............... 119/14.02, 14.36, 14.37, 119/14.54, 14.55

[56] References Cited

U.S. PATENT DOCUMENTS

| 947,156 | 1/1910 | Gillies | 119/14.36 |
| 2,727,491 | 12/1955 | Reeve | 119/14.54 |
| 3,776,196 | 12/1973 | Luiz | 119/14.36 |

FOREIGN PATENT DOCUMENTS

1160900 8/1969 United Kingdom ............. 119/14.54

Primary Examiner—Hugh R. Chamblee
Attorney, Agent, or Firm—Kontler, Grimes & Battersby

[57] ABSTRACT

A milking method and machine are disclosed which serve to prevent back-spray of milk particles onto the teat tips of the animal's udder. The individual milk streams issuing from the milk orifices of the teats during intermittent application of suction to the teats are directed into a path leading to a milk collector. In this path, the streams flow in milk tubes which open into an elongated hollow connector that, in turn, communicates with a conduit. The discharge ends of the milk tubes are positioned in the connector at two or more locations which are spaced from one another, as considered in the direction of milk flow through the connector. An air stream is admitted into the connector to flow in a direction toward the conduit so as to accelerate the milk and prevent droplets of milk from being sucked back into the milk tubes during intermittent application of suction to the teats.

52 Claims, 9 Drawing Figures

MILKING METHOD AND MACHINE

BACKGROUND OF THE INVENTION

The present invention relates to the milking of milk-producing animals, such as cows. More particularly, the invention relates to a method of milking such animals and to apparatus for carrying out the method.

In accordance with a known milking system, teat cups are applied to the teats of the animal's udder, and suction is intermittently applied to the teats via these cups. This causes streams of milk to issue from the milk orifices at the tips of the teats, and such streams are then combined and conveyed to a milk collecting vessel. A concurrently flowing stream of air entrains and accelerates the combined milk stream in a direction toward the collecting vessel.

Each change of pressure in the teat cups (i.e., a change from application to termination of suction) entials a propogation of suction toward the region where the individual milk streams issue from the teats. This tends to draw milk particles back into contact with the tips of the respective teats; a phenomenon which is highly undesirable because it may lead to entry of bacteria through the milk orifices. The just discussed back-spray problem is alleviated by the establishment of the concurrent air stream, especially in milking machines which apply a constant suction to the tips of the teats, but it is not entirely eliminated, particularly not in those milking machines in which the diaphragm in the teat cup intermittently interrupts the application of suction to the entire teat.

OBJECTS AND SUMMARY OF THE INVENTION

An object of the invention is to provide an improved milking method which eliminates the flow of milk back to the animal's teats.

Another object of the invention is to provide a novel and improved machine for the practice of the above outlined method.

One feature of the invention resides in the provision of a method which comprises combining the individual milk streams coming from the teats at at least two separate locations one of which is disposed downstream of the other, as considered in the direction of milk flow toward the collector vessel, and thereafter combining the thus obtained partial streams to form the main milk stream. A concurrent air stream for accelerating the milk streams is admitted at one or more of the aforementioned locations.

In accordance with the novel method, the flow of milk is stabilized at each of the two or more locations so that each milk flow from a preceding location already has a strong acceleration tendency towards the collector vessel by the time it is joined by a milk flow from a succeeding location, i.e., it actually generates suction acting in downstream direction. This tendency counteracts the ability of pressure fluctuations which are propagated from the teat cups to separate droplets of milk from the milk flow and to such them back into contact with the tips of the teats.

It is advantageous if the operation is such that the timed sequence of switchover from one to another teat cup under suction ensures that the combined milk stream has a strong tendency to flow in a direction toward the collector vessel. Therefore, droplets of milk are sucked past the openings from which individual milk streams are discharged at subsequent locations, even if a stray backflow tendency should be present at such openings due to opening up of the associated teat diaphragm.

The novel machine has milk tubes whose upstream ends receive milk from the teats and the downstream ends of which extend into an elongated hollow connector which, in turn, communicates at its downstream end with a conduit leading to a milk collector vessel. The downstream ends of the milk tubes are positioned in the connector at least at two locations which are spaced apart from each other, as considered in the direction of milk flow. At least one air inlet opening is provided for admitting into the connector an air stream flowing in a direction toward the outlet of the connector.

The individual streams can be so combined at each location that a pronouncedly stabilized milk flow toward the collector vessel develops at the time subsequent (downstream) milk flows or streams are added. This prevents the droplets of milk from being sucked back into contact with the teat tips.

The locations can be selected, based on the pulsing frequency (i.e., the frequency of application and interruption of application of suction) of the machine and the suction conditions, so that sufficient time is available between the pulses to facilitate the development of a stabilized main milk flow in a direction toward the collector vessel. The connector in which the merging of individual streams into larger streams takes place can be manufactured at a low cost and is easy to clean, the latter being one of the primary requisites in such machines. The connector reliably prevents the backspray of milk droplets to the teat tips of the animal being milked, and since such backspray is one of the primary causes of udder infections, the novel machine contributes greatly to a reduction of such problems.

The novel features which are considered as characteristic of the invention are set forth in particular in the appended claims. The improved milking machine itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
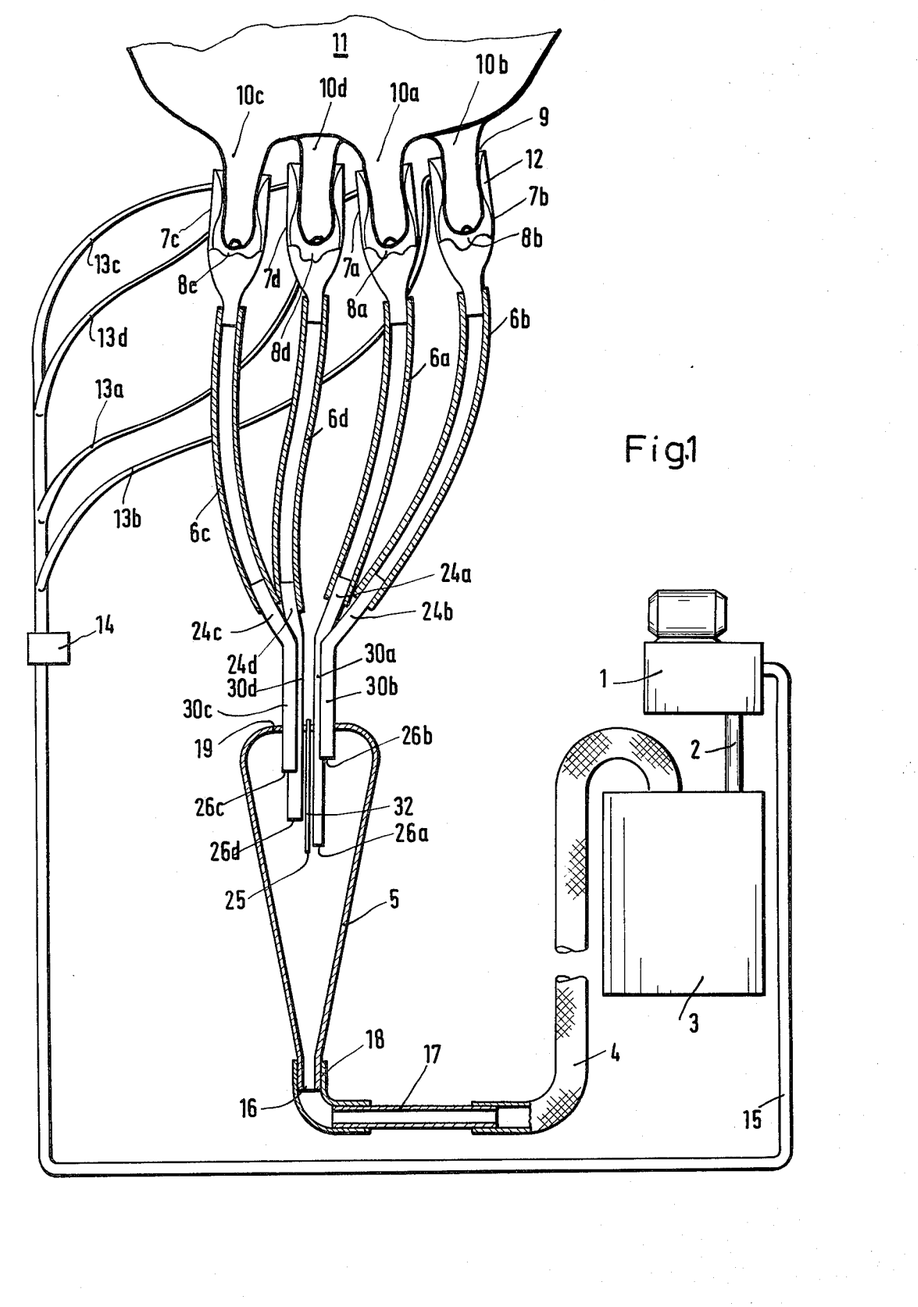
FIG. 1 is a somewhat diagrammatic partly sectional view of a milking machine which embodies one form of the invention.

A first embodiment of the improved milking machine is shown in FIG. 1. This machine comprises a suction generator 1, a vacuum conduit or suction line 2, a milk collector vessel 3, a milk feeding conduit 4, and a plurality of milk tubes 6a–6d whose upper (upstream) ends are respectively connected with teat cups 7a–7d. The teat cups 7a–7d respectively contain cupped elastic diaphragms 8a–8d whose outlet ends communicate with the milk tubes 6a–6d. Each diaphragm has an open end 9 remote from its outlet end, and teats 10a–10d on the udder 11 of the animal to be milked extend through the open ends 9 and into respective diaphragms 8a–8d.

An udder 11 has four quarters, two front quarters closer to the head of the animal (i.e., the rightward quarters in FIGS. 1–4) and two rear quarters closer to the tail of the animal. The letters a and b appended to the teat designation 10 identify the teats of the two front quarters of the udder; and the letters c and d denote the teats of the rear quarters. Where other reference numerals have the suffix a, b, c or d added to them, this is done to associate them clearly with the repective teats.

Each of the diaphragms 8a–8d defines with the respective teat cup 7a–7d a pulse (i.e., pressure) chamber 12; and each chamber is connected with a conventional generator 14 by one of four conduits or hoses 13a–13d. The pulse generator 14 alternately connects the respective chamber 12 via a conduit 15 (e.g., a hose) with the suction generator 1 and with the surrounding atmosphere. It goes without saying that the diaphragms 8a–8d are sealingly installed in the respective teat cups 7a–7d.

According to a feature of the invention, an elongated upright hollow connector 5 is installed between the milk tubes 6a–6d and the milk collector vessel 3. The connector 5 has an outlet end 18 provided with a milk discharging opening 16. The outlet end 18 is sealingly connected with the milk supply conduit 4 by a hose, tube or a like conduit 17. The elongation of the connector 5 is in the direction of milk flow from the teats 10a–10d toward the conduit 4, and the milk stream flows through the connector 5 without any changes in the direction of flow.

Four milk inlet pipes 24a–24d enter the connector 5 at a milk admitting (upstream) end 19 thereof. These inlet pipes respectively communicate with the milk tubes 6a–6d and receive milk therefrom. The pipes 24a–24d respectively comprise guide sections 30a–30d wherein the milk-air streams are oriented in such a way that, when they issue from the outlet ends of these sections 30a–30d, they advance along straight paths through the connector 5 toward the outlet end 18 thereof. The configuration of the pipes 24a–24d is such that the milk-air mixtures arriving from the teat cups 7a–7d can enter the sections 30a–30d without undergoing any substantial changes in the direction of flow and without being subjected to any significant acceleration.

In the embodiment of FIG. 1, the milk streams enter the connector 5 at four locations (stages), namely via the outlets 26b and 26c of sections 30b and 30c (the two upstream stages) and via the outlets 26a and 26d of the sections 30a and 30d (the two downstream stages).

An air inlet pipe 32 communicates at the inlet end 19 of connector 5 with the surrounding atmosphere. The pipe 32 is preferably located in the center between the sections 30a–30d which for this purpose may be arranged at the corners of a sqaure or in an analogous manner. The length of pipe 32 depends upon the length of the sections 30a–30d. The pipe 32 has an air outlet 25 which is located slightly downwstream of the milk outlet 26a; however, the pipe 32 may also have two or more outlets positioned at different locations.

The purpose of the pipe is to admit into the connector 5 an air stream which, flowing in the same direction (concurrently) as the milk streams, accelerates the milk streams toward the connector outlet 16 and thereby prevents "back-spray" of milk droplets to the tips of the teats 10a–10d.

If desired, the milk-stream accelerating air may be admitted at the teat cup diaphragms 8a–8d. For example (see FIG. 3), the collars 29a–29d of the diaphragms 8a–8d may be provided with air inlet openings 28a–28d for this purpose. Air which is aspirated through these air inlet openings serves to accelerate the discrete milk streams from each teat in a direction toward the collector vessel 3. The thus accelerated milk streams then enter the connector 5 at the four stages defined by the outlet openings 26a–26d and merge in the connector 5 to form a combined milk flow having a strong flow characteristic in a direction toward the conduit 4 and vessel 3 so that sucking-back of milk droplets from this flow is reliably prevented under all operating conditions of the diaphragms 8a–8d.

The air inlet pipe 32 may be provided in the connector 5 in addition to the air inlet openings 28a–28d, and such pipe may have one or more outlets located at one or more milk discharge stages.

Figure 3:
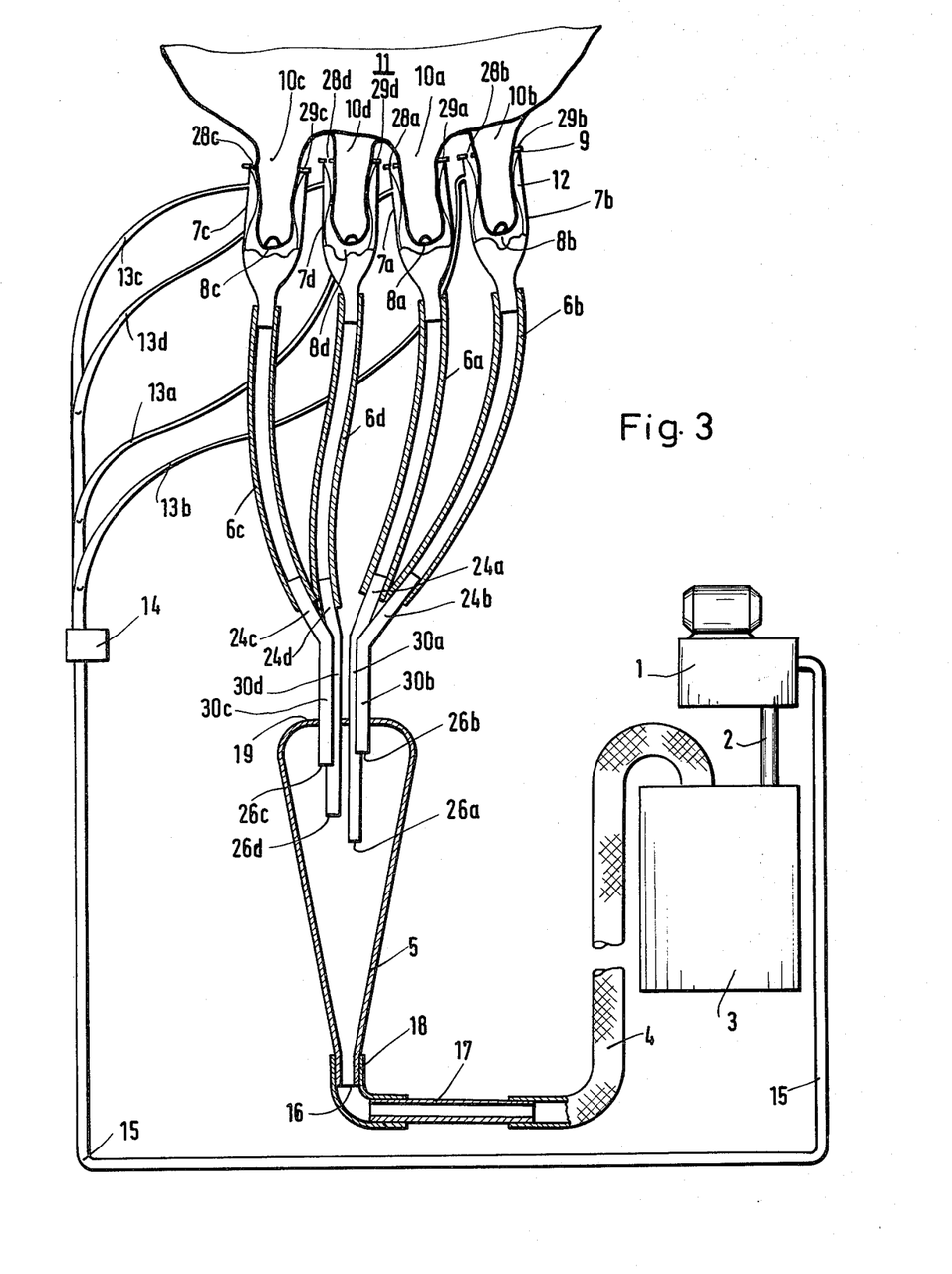
FIG. 3 is a view similar to that of FIG. 1 but showing a third embodiment.
Figure 4:
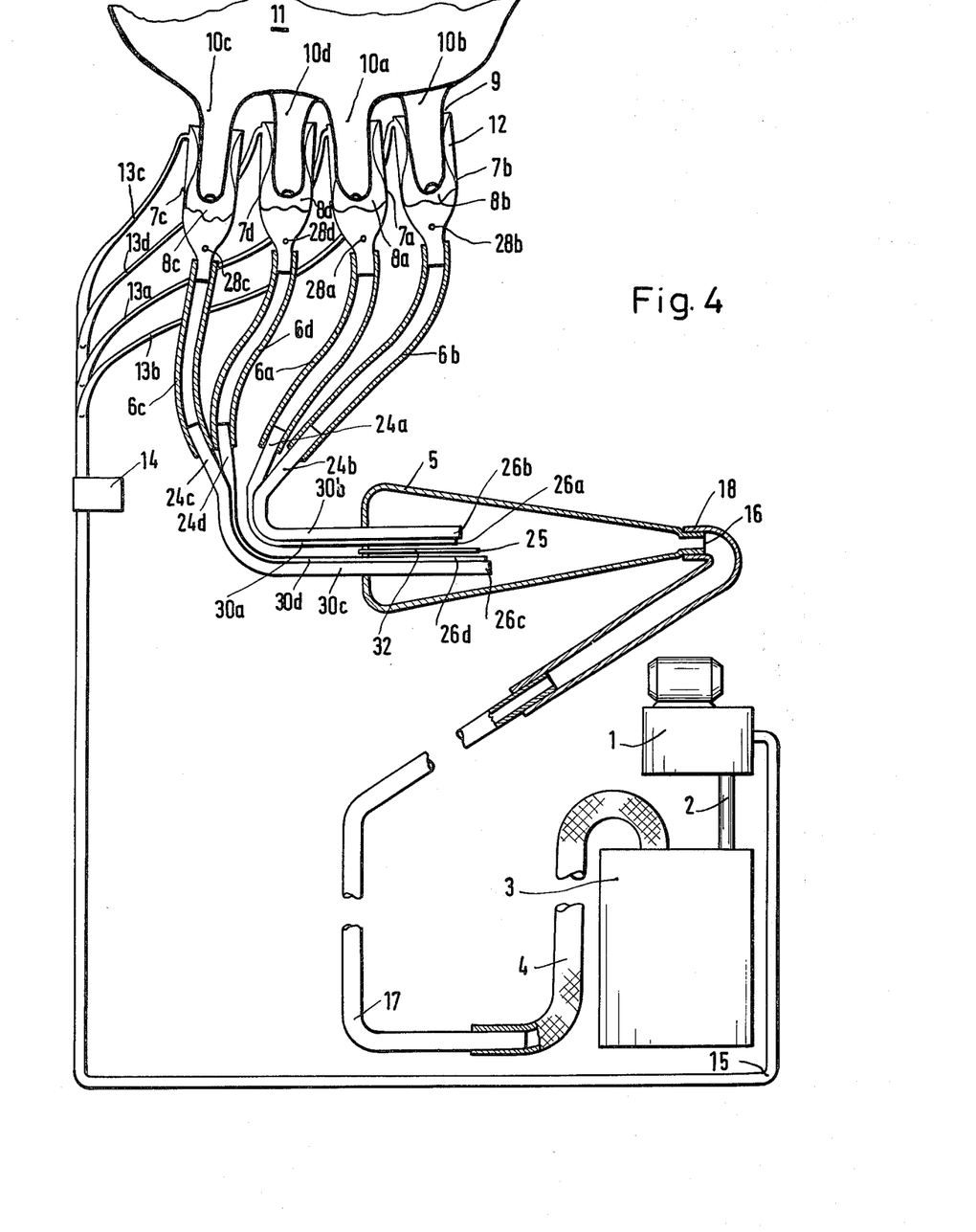
FIG. 4 is a view similar to that of FIG. 2 but showing a fourth milking machine.

The air inlet openings 28a–28d need not be provided in the teat cup diaphragms, as shown in FIG. 3, but can be provided in the teat cups 7a–7d, e.g., in a manner as shown in FIG. 4. Such openings communicate with the outlets through which the streams of extracted milk are withdrawn from the respective teat cups. It is further possible to combine the two features by providing air inlet openings 28a–28d in the teat cups as well as in the diaphragms. The dimensions of the air inlet openings must be such that the openings admit sufficient quantities of air to adequately accelerate the milk streams in a direction toward the vessel 3. On the other hand, the openings should not be so large as to unnecessarily reduce the suction which is needed for proper performance of the miling operation. It is best to select for the air inlet openings 28a–28d cross sections which permit exact determination of the quantity of inflowing air at a predetermined subatomspheric pressure. The cross section of each opening may be calibrated. If desired, nozzles may be installed in the air inlet openings 28a–28d. In each embodiment (i.e., air inlet openings in the diaphragms, in the teat cups or in both), additional air may be admitted directly into the connector 5 via one or more air pipes 32.

Figure 2:
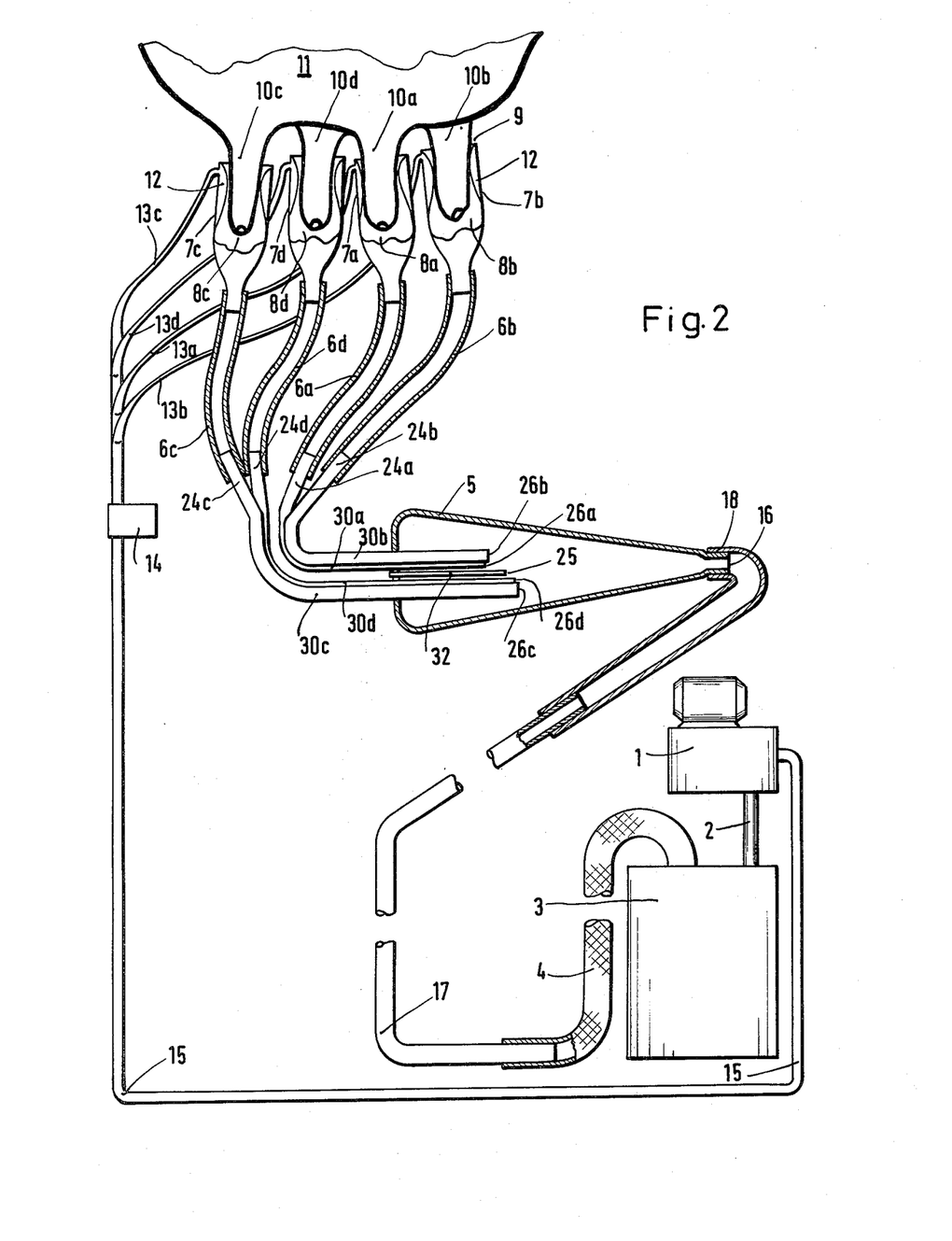
FIG. 2 is a view similar to that of FIG. 1 but showing another embodiment of the milking machine.

In the embodiment of FIG. 2, the connector 5 is horizontal and there are two milk admitting stages, namely, one (shown at 26c) at the loci of the outlet openings of the pipes 30c and 30d and the other one (shown at 26a) at the loci of the outlet openings of pipes 30a, 30b. The outlet opening 25 of the air admitting pipe 32 is located between the stages 26a, 26c and the air stream issuing from the pipe 32 accelerates the individual milk streams issuing from the pipes 24a, 24b sufficiently so that any droplets of milk which might become separated from the individual streams are also accelerated toward the opening 16 and cannot be aspirated into the pipes 24c, 24d (in a direction toward the tips of the teats 10c, 10d) if they advance along the outlets 26c, 26d of these pipes while suction prevails at the teat cups 7c, 7d.

Under certain circumstances, it may be advantageous to have the pipes communicating with the teats 10a, 10b of the two front udder quarters terminate at the downstream stage (26c), whereas the pipes communicating with the teats 10c, 10d of the rear udder quarters terminate at the upstream stage (26a). It may also be advantageous if, contrary to the illustration in FIG. 2, the downstream stage (26c) is located at a level above the upstream stage (26a) rather than the reverse arrangement which is shown in FIG. 2.

Figure 3A:
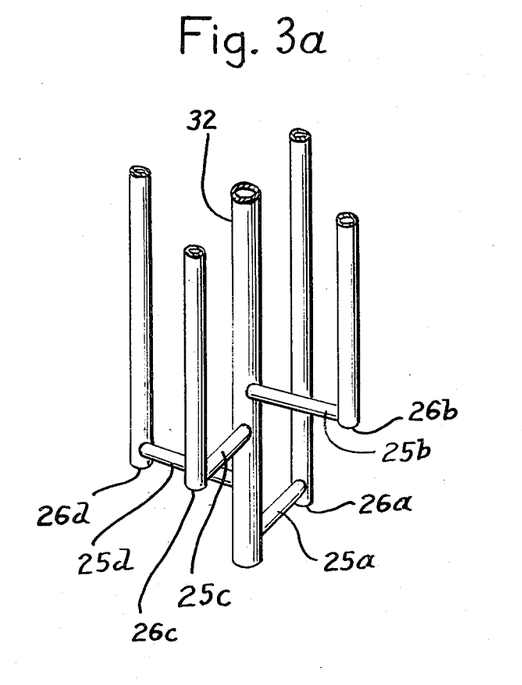
FIG. 3a is a perspective view of a detail in the machine of FIG. 3.

FIGS. 3 and 3a show a machine wherein the connector 5 is at least substantially vertical and confines four discrete milk admitting stages (outlet openings 26a, 26b, 26c and 26d). The pipes 24a, 24d associated with the udder quarters including the teats 10a, 10d terminate at the downstream stages (26a, 26d), whereas the pipes 24b, 24d associated with the udder quarters including the teats 10b, 10c terminate at the two upstream stages (26b, 26c). The air pipe 32 (see FIG. 3a) has four air outlet openings 25a–25d each of which terminates at one of four stages (26a–26d). The outlet openings 25a–25d communicate with the respective pipes slightly upstream of the respective stages 26a–26d, so that each individual milk stream is already accelerated toward the outlet end 18 before it is discharged into the connector 5. This ensures that no milk droplets from an accelerated stream can be aspirated into the next downstream pipe (i.e., droplets issuing from the pipe 30b cannot be aspirated into the pipe 30a as the milk stream issuing from pipe 30b flows past the outlet end of the pipe 30a).

The pipes 24a, 24c may terminate at the stages 26b, 26c, and the pipes 24b, 24d may terminate at the stages 26a, 26d. Furthermore, depending upon the given circumstances, the connector 5 may be horizontal and the stages 26c, 26d are then arranged at a level below or above the level of the stages 26b, 26c.

In accordance with another modification, the air pipe 32 may have a single air outlet opening 25 which is located at one of the stages or else intermediate the stages. Furthermore, the pipe 32 could have two openings 25 one of which is associated with the stages 26b, 26c and the other of which is associated with the stages 26a, 26d.

Referring again to FIG. 4, the milk tubes 24a, 24b terminate at the stages 26a, 26b which are located downstream of the stages 26c, 26d at which the milk tubes 24c, 24d terminate. The tubes 24c, 24d are associated with the teats 10c, 10d of the rear udder quarters. The stage 26a is located below the stage 26b; the stage 26c is located below stage 26d; and the stages 26c, 26d are located at a level below the stages 26a, 26b.

Figure 6:
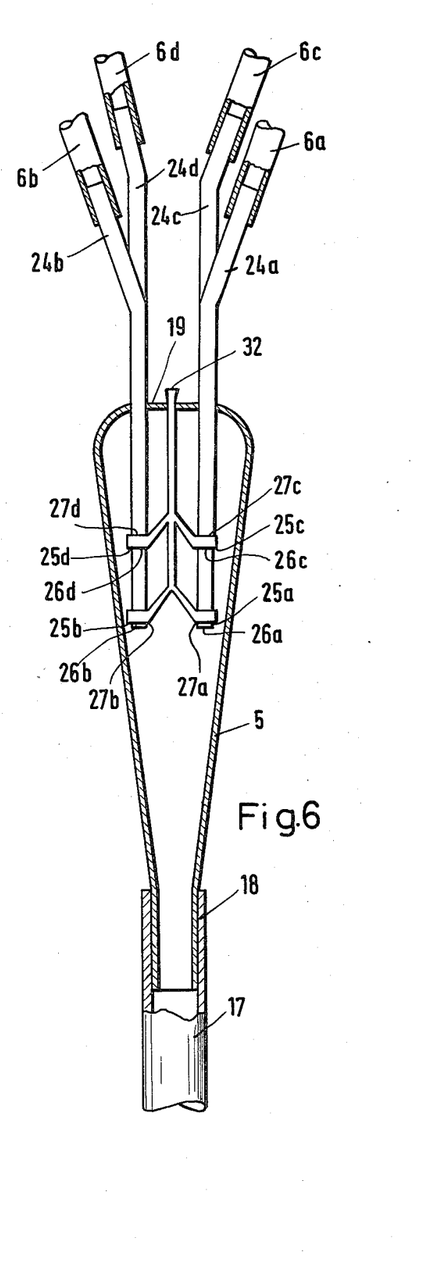
FIG. 6 is a view similar to that of FIG. 5 but illustrating a modified connector.

The air pipe 32 of FIG. 4 is horizontal and its preferred configuration corresponds to that shown in FIG. 6 (the embodiment of FIG. 6 differs from that of FIG. 4 mainly in that the connector 5 is vertical). The air pipe 32 of FIG. 6 has outlet openings 25a–25d each of which is associated with one of the stages 26a–26d (all of which are not staggered in the direction of milk flow). The arrangement is such that air issuing from an outlet opening flows along the external surface of the respective milk pipe, for which purpose the milk pipes 24a–24d are surrounded by air discharging rings 27a–27d having the aforementioned air outlet openings 25a–25d which face in a direction toward the outlet end 18 of the connector 5. The openings 25a–25d may be annular slots, annuli of individual openings or the like. Air issuing from the openings 25a–25d surrounds the individual milk streams issuing from the pipes 24a–24d so that even those milk droplets which are located in the outer boundary zones of the respective streams undergo sufficient acceleration so that they cannot be aspirated into the next-following (downstream) milk pipe outlets.

The rings 27 may be used with equal advantage in other embodiments of the machine. They may be located at the outlet ends of the pipes 24a–24d (i.e., at the stages 26a–26d) or slightly upstream thereof.

Figure 5:
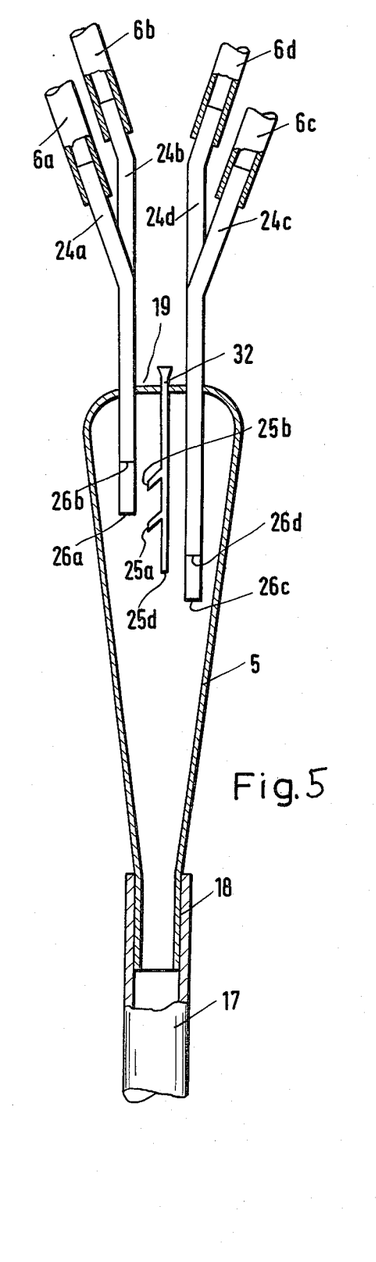
FIG. 5 is an enlarged fragmentary longitudinal sectional view of a connector.

FIG. 5 shows a vertical connector 5 wherein the pipes 24c, 24d which are associated with the two rear udder quarters terminate further downstream than the pipes 24a, 24b which are associated with the two front udder quarters. This embodiment has an air pipe 32 with three air outlet openings 25a, 25b, 25d which are respectively located intermediate the stages 26b–26a, 26a–26d and 26d–26c. The openings 25a, 25b, 25d are directed toward the respective milk streams to be accelerated and terminate shortly ahead of such milk streams so that the air streams have a first component of movement in a downstream direction (toward outlet 18) and a second component of movement transverse to the milk streams.

An advantage of this arrangement is that the milk streams issuing at the respective stages are pushed outwardly and away from one another. This ensures that the milk from these individual streams is uniformly distributed over the cross section of the connector 5. The area surrounded by the pipes 24c–24d in the connector 5 is relatively free of milk so that no milk droplets can be aspirated out of it for movement back toward the teats (not shown).

The arrangement of FIG. 5 is especially suited for use with vertical connectors 5. However, it can also be used with horizontal connectors and irrespective of the positioning of pipes 24a–24d relative to one another. Also, it is of no consequence whether each milk tube terminates at a separate stage, as shown in FIG. 5, or whether two or more milk tubes terminate together at one stage, and other milk tubes terminate at another stage.

In FIG. 6, the connector 5 is vertical and the outlet openings 25a, 25c of the air pipe 32 are directly associated with the downstream stages 26a, 26c (i.e., they communicate with the outlet openings of the pipes 24a, 24c), while the outlet openings 25b, 25d are associated with the upstream stages 26b, 26d. The outlet openings 25a–25d are directed against the outlets at the stages 26a–26d so that satisfactory entrainment of milk droplets between the milk pipes 24a–24d is to be expected in this embodiment. Since the milk streams issuing at the stages 26a–26d already have a pronounced component of flow in a downstream direction, they are unlikely to be deflected by the air streams.

Figure 7:
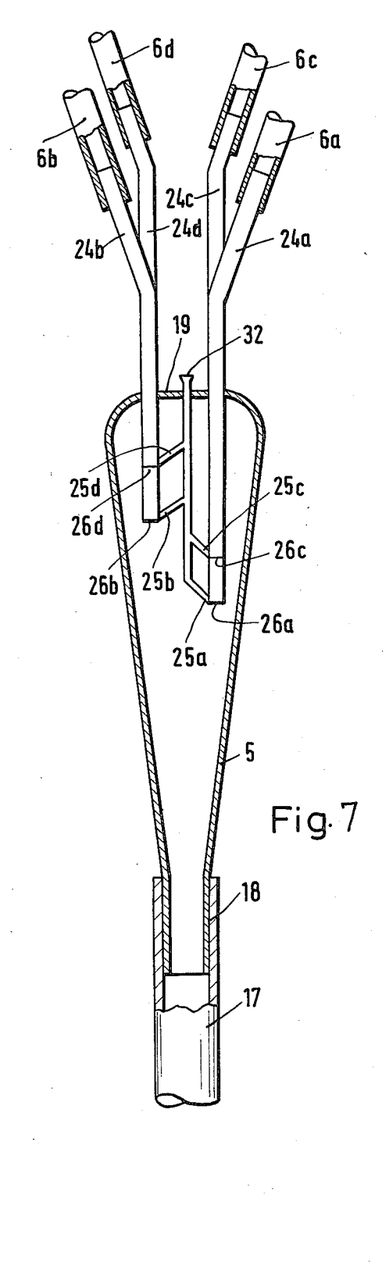
FIG. 7 is a view similar to that of FIG. 5 but showing a further connector.

In the embodiment of FIG. 7, the pipes 24a, 24b which are associated with the two front quarters of the udder (not shown) terminate at the stages 26c and 26d, whereas the other two pipes 24c, 24d terminate at the stages 26a, 26b. However, any other desired relationship may be chosen.

Figure 8:
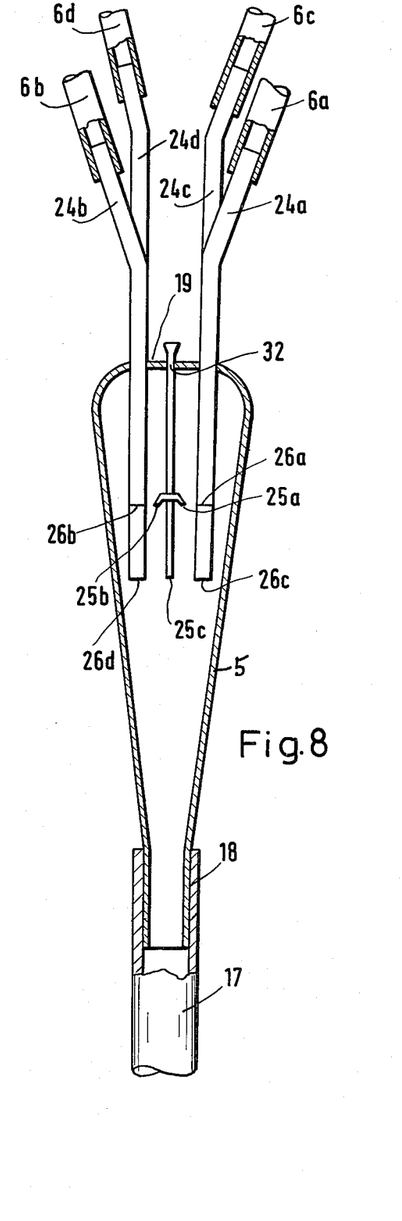
FIG. 8 is a view similar to that of FIG. 5 but showing still another connector.

In FIG. 8, the vertical connector 5 has an air pipe 32 with three outlets 25a, 25b and 25c. The stages 26a and 26b terminate at the same level, and the same relationship holds true for the stages 26c and 26d. The air outlets 25a and 25b are respectively directed at milk streams entering the connector 5 at the stages 26a and 26b; the outlet 25c discharges intermediate the stages 26c, 26d in a downstream direction.

The operation is as follows.

In operation of any of the disclosed embodiments, the suction generator 1 establishes a subatmospheric pressure which is required for the milking operation. The milking machine is then connected to the suction generator 1 so that the subatmospheric pressure is propagated to the teat cups 7a–7d. The cups are then placed onto the teats 10a–10d and the milk begins to flow. At the same time, the operator starts the pulse generator 14 which now controls the pressure in the chambers 12. When the pulse generator 14 connects the chambers 12 to the atmosphere, suction in the diaphragms 8a–8d causes them to engage the respective teats and produce a massaging effect. Moreover, the thus collapsed diaphragms 8a–8d prevent the tips of the teats from being subjected to the influence of suction.

Upon completion of the above described phase which can be called the relaxation of relief phase, the pulse generator 14 disconnects the chambers 12 from the atmosphere and connects them to the suction generator 1 so that suction lifts the diaphragms off the surfaces of the teats. Suction in a diaphragm results in extraction of a fresh stream of milk from the respective teat; at the same time, milk is discharged in a direction toward the connector 5. The flows of milk-air mixture in the pipes 24a–24d are parallel with one another so that each individual stream enters the connector 5 by flowing in a direction which is parallel to the longitudinal extension of the connector. The thus obtained flow generates suction in the region of the milk admitting end 19 so that an air stream is aspirated via air pipe 32. Air issuing from the outlet or outlets 25 of the air pipe 32 accelerates the milk-air mixture in a direction toward the milk discharging opening 16. Air which is admitted via air inlet openings 28a–28d on the diaphragms 8a–8d and/or the teat cups 7a–7d has the same effect.

The pulse generator 14 controls the pressure in the chambers 12. During collapse of the diaphragms 8a–8d, the milk-air mixture receives an additional impetus in a direction toward the connector 5; during opening of the diaphragms (i.e., during application of suction), the mixture tends to be sucked back toward the teat cups. This produces in conventional machines the undesirable wetting of the teat tips with milk. According to the present invention, however, the acceleration imparted to the milk flowing in the connector 5 in a direction toward the connector outlet 16 is so pronounced that the suction effect of the expanding diaphragms is not sufficient to aspirate milk back into contact with the teat tips. Since the teats remain dry, i.e., since no milk infected with mastitis-causing organisms can reach the teats from the connector 5, the infection of a healthy udder is precluded.

The novel method can be practiced by resorting to milking machines which operate with conventional (commercially available) teat cups and diaphragms of the kind discused earlier. However, the improved method can be practiced with equal advantage for withdrawal of milk without pulsing, i.e., by using a single-chamber teat cup. Also, the method can be practiced by resorting to teat cups which have elastic inserts only over a part of their interior. Each insert (controlled by a pulse generator 14) is alternatively subjected to suction and to atmospheric pressure to ensure adhesion of the teat cups to the upper parts of the teats.

The invention is susceptible of numerous other modifications. For example, the construction and configuration of the air pipe 32 can conform to specific milking requirements or conditions. Depending upon the suction chosen and the air and milk quantities to be advanced, the outlet opening or openings of the pipe 32 may be larger or smaller, as the case may be. The outlet openings may constitute or may be provided with nozzles to direct the air streams to the desired locations at a preselectable speed. The outlet openings may be designed to cause twisting or eddying of the air streams in order to strip droplets of milk from the wall of the connector 5. What counts is to produce in the region of the milk admitting stages 26a, 26b, 26c, 26d an atmosphere which is as free as possible of free-flowing milk droplets (i.e., milk droplets which are separate from and not well entrained by the milk stream). This measure ensures that suction which develops at the stages 26a–26d when a teat diaphragm opens up (i.e., is subjected to vacuum) will not be able to cause a back flow of milk droplets that is capable of reaching and wetting the tips of the teats.

Without further analysis, the foregoing will so fully reveal the gist of the present invention that other can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

I claim:

1. A method of milking a milk producing animal, such as a cow, comprising the steps of alternately applying and interrupting the application of suction to the teats of the animal's udder so that successive individual streams of milk issue from milk orifices at the tips of the respective teats; establishing a path for the flow of said streams to a collector station; admitting at at least one of said individual milk streams into said path at a first location and admitting at least one other individual stream into said path at at least one second location downstream of said first location for combined flow with said first stream; and introducing into said path a concurrent stream of air in the region of at least one of said locations so as to accelerate the flowing milk in a direction toward the collector station and thereby prevent droplets of milk from being aspirated back into contact with the teat tips during subsequent applications of suction to the teats.

2. The method of claim 1, wherein said admitting steps include discharging two individual milk streams into said path at said first location and admitting two further individual milk streams into said path at said second location.

3. The method of claim 2, wherein the milk streams which are admitted at said first and second locations respectively originate from teats in the front and rear quarters of the animal's udder.

4. The method of claim 2, wherein one of the milk streams admitted at each of said locations originates from teats in the front quarter of the animal's udder, and the other of the milk streams admitted at each of said locations originates from teats in the rear quarter of the udder.

5. The method of claim 2, wherein the milk streams admitted at said second location originate from teats located in the two left quarters of the animal's udder, and the milk streams admitted at said first location originate from teats in the two right quarters of the udder.

6. The method of claim 1, wherein said admitting steps comprise discharging three individual milk streams into said path at one of said locations and one individual stream at the other of said locations.

7. The method of claim 1, wherein there are four individual milk streams which are discharged into said path at four locations all of which are staggered with reference to each other, as considered in the direction of flow toward the collector station.

8. The method of claim 1, wherein said introducing step comprises admitting the air stream intermediate said locations.

9. The method of claim 1, wherein said introducing step comprises admitting the air stream into said path at positions between successive ones of said locations.

10. The method of claim 1, wherein said introducing step comprises admitting an air stream into said path at each of said locations.

11. The method of claim 1, wherein said introducing step comprises directing the air stream toward the center of the combined flow.

12. The method of claim 1, wherein said introducing step comprises directing the air stream toward a region disposed in the center between the admitted milk streams.

13. The method of claim 1, wherein said introducing step comprises directing the air stream at each of the individual admitted milk streams.

14. The method of claim 1, wherein said introducing step comprises admitting the air stream into said path at least at one position which is downstream of said second location.

15. The method of claim 1, wherein said introducing step comprises admitting the air stream into the path at a position which is upstream of at least one of said locations.

16. The method of claim 1, wherein said introducing step comprises admitting the air stream into the path at least at one position upstream of said locations.

17. The method of claim 1, wherein said introducing step comprises admitting air from said air stream into each of said individual milk streams.

18. The method of claim 1, wherein suction is applied via teat cups connected to the respective teats, said introducing step comprising admitting a partial flow of air via each of the teat cups.

19. The method of claim 1, wherein suction is applied via diaphragms in teat cups connected to the respective teats, said introducing step comprising admitting a partial flow of air via each of the diaphragms.

20. The method of claim 1, wherein said introducing step comprises admitting the air stream by way of a nozzle.

21. The method of claim 1, wherein said admitting steps include conveying the individual milk streams from the respective teats to said path via milk tubes, said introducing step comprising admitting the air stream along the wall of at least one of the milk tubes.

22. In a machine for milking a milk-producing animal, such as a cow, of the type having teat cups which are connectable to the teats of the animal's udder and which intermittently apply suction to the teats so that individual streams of milk issue from milk orifices at the tips of the teats, a combination comprising a plurality of milk tubes each having an upstream end communicating with one of the teat cups and a free downstream end; a milk collector; conduit means communicating with said collector; an elongated hollow connector having an upstream end portion and a downstream end portion communicating with said conduit means, said downstream ends of said milk tubes extending through said upstream end portion into said connector and terminating at at least two locations one of which is downstream of the other; and means for admitting a concurrent air stream into said connector to accelerate the milk therein toward said conduit means and to thereby prevent droplets of milk from being aspirated back into contact with the teat tips during subsequent applications of suction to the teats.

23. A combination as defined in claim 22, wherein each of said milk tubes has a downstream end section provided with the respective free downstream end, said downstream end sections being parallel to one another.

24. A combination as defined in claim 22, wherein there are four milk tubes, the downstream ends of two of said milk tubes terminating at said one location and the downstream ends of the other two milk tubes terminating at said other location.

25. A combination as defined in claim 22, wherein two of said milk tubes communicate with teat cups connectable to the teats of the two rear quarters of the udder and their free downstream ends terminate at a first one of said locations, said milk tubes including two additional milk tubes which communicate with teat cups connectable to the teats of the two front quarters of the udder and the free downstream ends of which terminate at a second one of said locations.

26. A combination as defined in claim 25, wherein said first location is said other location and said second location is said one location.

27. A combination as defined in claim 22, wherein two of said milk tubes communicate with teat cups connectable to the left-side teats of the udder and their free downstream ends terminate at a first one of said locations, said milk tubes including two additional tubes which communicate with teat cups connectable to the right-side teats of the udder and the free downstream ends of which terminate at a second one of said locations.

28. A combination as defined in claim 22, wherein there are four milk tubes and the free downstream ends of three of said milk tubes terminate at a first one of said locations whereas the free downstream end of the fourth milk tube terminates at a second one of said locations.

29. A combination as defined in claim 22, wherein there are four milk tubes, the free ends of two of said milk tubes terminating at one each of said two locations and the free ends of the remaining two milk tubes terminating at additional locations downstream of said two locations.

30. A combination as defined in claim 22, wherein said admitting means comprises a plurality of air inlet openings each provided at one of said teat cups.

31. A combination as defined in claim 22, wherein each of the teat cups has a teat-engaging diaphragm, said admitting means comprising a plurality of air inlet openings each provided in one of the diaphragms.

32. A combination as defined in claim 22, wherein said admitting means has at least one calibrated air inlet opening.

33. A combination as defined in claim 22, wherein said admitting means comprises at least one air inlet opening in the region of said connector.

34. A combination as defined in claim 22, wherein said admitting means comprises an air inlet opening at one of said locations.

35. A combination as defined in claim 22, wherein said admitting means comprises an air inlet between said locations.

36. A combination as defined in claim 22, wherein said admitting means comprises an air inlet located centrally in the milk flow resulting from the discharge of individual milk streams into said connector at said locations.

37. A combination as defined in claim 22, wherein said admitting means comprises an air inlet located centrally of the individual milk streams discharged from said free downstream ends at said locations.

38. A combination as defined in claim 22, wherein said admitting means comprises air inlet means for directing an air flow at each of the individual milk streams discharged from said free downstream ends at said locations.

39. A combination as defined in claim 22, wherein said admitting means comprises air inlet means for directing an air flow at the downstream end of each of said milk tubes.

40. A combination as defined in claim 22, wherein said admitting means comprises air inlet means communicating with each of said milk tubes upstream of the free downstream end of the respective tube to direct air flows into the individual milk streams passing through said milk tubes.

41. A combination as defined in claim 22, wherein said admitting means comprises air inlet means for directing an air flow at each individual milk stream downstream of the respective free downstream end.

42. A combination as defined in claim 22, wherein said admitting means comprises air inlet means for directing air flows against the exterior of the respective milk tubes.

43. A combination as defined in claim 22, wherein said connector is substantially vertical and said admitting means comprises an air pipe having an outlet within the connector, said free downstream ends and said outlet being vertically spaced from one another.

44. A combination as defined in claim 22, wherein said connector has a substantially horizontal axis and said locations are spaced along said axis.

45. A combination as defined in claim 44, wherein said connector has an upper part, said milk tubes including two tubes communicating with the teat cups for the teats in the two front quarters of the udder and having their free downstream ends at said one location and in said upper part, said milk tubes also including two further tubes communicating with the teat cups for the teats in the two rear quarters of the udder and having their free downstream ends at said other location.

46. A combination as defined in claim 44, wherein said connector has a lower part, said milk tubes including two tubes communicating with the teat cups for the teats in the two front quarters of the udder and having their free downstream ends at said one location and in said lower part, said milk tubes also including two further tubes communicating with the teat cups for the teats in the two rear quarters of the udder and having their free downstream ends at said other location.

47. A combination as defined in claim 44, wherein said connector has an upper part, said milk tubes including two tubes communicating with the teat cups for the teats in the two left-side quarters of the udder and having their free downstream ends at said one location and in said upper part, said milk tubes also including two further tubes communicating with the teat cups for the teats in the two right-side quarters of the udder and having their free downstream ends at said other location.

48. A combination as defined in claim 44, wherein said connector has a lower part, said milk tubes including two tubes communicating with the teat cups for the teats in the two left-side quarters of the udder and having their free downstream ends at said one location and in said lower part, said milk tubes also including two further tubes communicating with the teat cups for the teats in the two right-side quarters of the udder and having their free downstream ends at said other location.

49. A combination as defined in claim 44, wherein said milk tubes include two tubes communicating with the teat cups for the teats in the two rear quarters of the udder and having their free downstream ends at said one location, said milk tubes also including two further tubes communicating with the teat cups for the teats in the two front quarters of the udder and having their free downstream ends at said other locations, said one location being at a level above said other location.

50. A combination as defined in claim 44, wherein said milk tubes include two tubes communicating with the teat cups for the teats in the two rear quarters of the udder and having their free downstream ends at said one location, said milk tubes also including two further tubes communicating with the teat cups for the teats in the two front quarters of the udder and having their free downstream ends at said other location, said one location being at a level below said other location.

51. A combination as defined in claim 44, wherein said milk tubes include four individual tubes the free downstream end of one of which is located in said connector at a level below the free downstream ends of the other tubes, said free downstream end of said one tube being further downstream in said connector than the free downstream ends of said other tubes.

52. A combination as defined in claim 44, wherein said milk tubes include four individual tubes the free downstream end of one of which is located in said connector at a level above the free downstream ends of the other tubes, said free downstream end of said one tube being further downstream in said connector than the free downstream ends of said other tubes.

* * * * *